(12) United States Patent
De' Longhi et al.

(10) Patent No.: US 12,144,455 B2
(45) Date of Patent: Nov. 19, 2024

(54) MACHINE FOR PREPARING BEVERAGES AND METHOD OF CONTROL

(71) Applicant: DE' LONGHI APPLIANCES S.R.L. CON UNICO SOCIO, Treviso (IT)

(72) Inventors: Giuseppe De' Longhi, Treviso (IT); Gianpaolo Trevisan, San Martino Buon Albergo (IT); Renzo Mazzon, Silea (IT)

(73) Assignee: DE' LONGHI APPLIANCES S.R.L. CON UNICO SOCIO, Treviso (IT)

( * ) Notice: Subject to any disclaimer, the term of this patent is extended or adjusted under 35 U.S.C. 154(b) by 497 days.

(21) Appl. No.: 16/766,699

(22) PCT Filed: Nov. 23, 2018

(86) PCT No.: PCT/IT2018/050229
§ 371 (c)(1),
(2) Date: May 24, 2020

(87) PCT Pub. No.: WO2019/102513
PCT Pub. Date: May 31, 2019

(65) Prior Publication Data
US 2020/0323383 A1    Oct. 15, 2020

(30) Foreign Application Priority Data

Nov. 23, 2017   (IT) .................. 102017000134753

(51) Int. Cl.
*A47J 31/057*    (2006.01)
*A47J 31/06*     (2006.01)
(Continued)

(52) U.S. Cl.
CPC ....... *A47J 31/0573* (2013.01); *A47J 31/0652* (2013.01); *A47J 31/461* (2018.08);
(Continued)

(58) Field of Classification Search
None
See application file for complete search history.

(56) References Cited

U.S. PATENT DOCUMENTS

2006/0096465 A1    5/2006 Hu et al.
2011/0252976 A1    10/2011 Liu

FOREIGN PATENT DOCUMENTS

CA    2909352 A1 * 10/2014 ............. A47J 31/40
CN    103381918 A1 * 11/2013 ............. B65D 47/12
(Continued)

OTHER PUBLICATIONS

Machine translation of CN 104768433 A performed on Jul. 12, 2022, Grassia (Year: 2015).*
(Continued)

*Primary Examiner* — Dana Ross
*Assistant Examiner* — Kevin Guanhua Wen
(74) *Attorney, Agent, or Firm* — MARSHALL, GERSTEIN & BORUN LLP

(57) ABSTRACT

A machine for preparing beverages includes at least one tank for the water, fluidly connected, by means of a circuit, to a filtering container suitable to contain an aromatic mixture to be brewed, a pump to feed the water from said tank to said circuit, a heating device to heat the water in transit, and a control and command unit functionally connected to a user interface comprising commands suitable to select the characteristics of said beverage to be prepared.

14 Claims, 2 Drawing Sheets

(51) Int. Cl.
*A47J 31/46* (2006.01)
*A47J 31/52* (2006.01)

(52) U.S. Cl.
CPC .......... *A47J 31/462* (2013.01); *A47J 31/468* (2018.08); *A47J 31/469* (2018.08); *A47J 31/5253* (2018.08); *A47J 2202/00* (2013.01)

(56) References Cited

FOREIGN PATENT DOCUMENTS

| | | | | |
|---|---|---|---|---|
| CN | 104768433 A * | 7/2015 | ............ | A47J 31/469 |
| CN | 105813511 A1 * | 7/2016 | ............ | A47J 31/401 |
| EP | 2 127 567 A1 | 12/2009 | | |
| EP | 2 353 469 A1 | 8/2011 | | |
| JP | 2016527014 A1 * | 9/2016 | ............ | A47J 31/38 |
| WO | WO-2014/032110 A1 | 3/2014 | | |
| WO | WO 2015077367 A1 * | 5/2015 | ............ | A47J 31/42 |
| WO | WO 2015148089 A1 * | 10/2015 | ............ | A47J 31/52 |
| WO | WO-2016/034255 A1 | 3/2016 | | |
| WO | WO 2016164796 A1 * | 10/2016 | ............ | A47J 31/44 |
| WO | WO 2017067854 A1 * | 4/2017 | ............ | A47J 31/60 |

OTHER PUBLICATIONS

Machine translation of CN 103381918 A1 performed on Feb. 22, 2024, Xu (Year: 2013).*
Machine translation of CN 105813511 A1 performed on Feb. 22, 2024, Dubief et al. (Year: 2016).*
Machine translation of JP 2016527014 A1 performed on Feb. 22, 2024, Song et al. (Year: 2016).*
International Search Report and Written Opinion for PCT/IT2018/050229, mailed Mar. 27, 2019.
International Preliminary Report on Patentability (Chapter II Demand) for PCT/IT2018/050229, mailed Nov. 12, 2019.

* cited by examiner

MACHINE FOR PREPARING BEVERAGES AND METHOD OF CONTROL

FIELD OF THE INVENTION

The present invention concerns a machine, either automatic or semiautomatic, suitable for preparing beverages, advantageously hot, such as coffee, tea, various infusions, or even just water, and a method to control the functioning thereof.

BACKGROUND OF THE INVENTION

Machines that produce American-style coffee are known, that is, those long coffees also called "drip coffee", obtained by brewing a quantity of coffee powder with hot water.

The Applicant set himself the problem of improving these machines, making them suitable to provide a wide range of beverages, whether cold, or, advantageously, hot.

It is known that current machines have a tank for the water, a device for heating the water, a container suitable for positioning a filtering element for the coffee powder, or other aromatic mixture, which is passed through by the hot water, and a receptacle, for example a jug, normally suitable to contain a maximum volume sufficient to fill a certain number of cups or glasses for the end users.

The jug is normally associated with its own heating means to keep the coffee beverage dispensed in the jug hot.

The heating device is generally put in co-operation with the tank, or put downstream of the tank, for example along a pipe that connects an exit of the tank to the filtering container.

When the heating device is activated, the heated water is made to flow from the tank to the filtering container in a known manner, either by convective motion, or by means of a pumping element.

The mixture can be introduced or loaded manually, or automatically into the filtering element. Means for containing the powdered mixture, and/or metering means and automatic loading means can be present.

It is also known that such machines are generally structured and organized to provide the filtering container with the quantity of hot water useful and/or necessary, or to empty the tank.

These machines have a number of limitations and/or disadvantages.

A first disadvantage is that they dispense a fixed quantity of brewed beverage.

Another disadvantage is that they are generally structured to dispense only coffee-based brewed beverages, so that they are not structured to dispense tea-based brewed beverages or other plant substances, or not.

In fact, known solutions do not allow to precisely modify the temperature of the water fed at exit, in order to adapt it to aromatic mixtures of different types.

It is indeed known that in order to prepare beverages based on tea or other vegetable substances, or other, different infusion temperatures than those required for coffee are generally required. Furthermore, different types of substances require different infusion times and temperatures.

These known machines, moreover, are not suitable for dispensing only hot water. If a user wishes to obtain only hot water, he can avoid filling the filtering container with the aromatic mixture; however, the hot water in any case passes through the filtering container, and therefore it can also marginally absorb the aromas, or other, retained inside it, remaining contaminated.

Machines for preparing a brewed beverage are known, which provide to divert a portion of the heated water so that it does not transit through the powdered mixture but is delivered directly into the receptacle that receives the beverage. This solution is implemented in part to reduce the dispensing time of the brewed beverage, and in part to dilute the intensity of the taste thereof that otherwise could be excessive.

However, in the known machines as above, it is provided that a portion of the stream of heated water in any case passes through the filtering container, with the problems described above.

From WO-A-2014/032110, for example, a machine is known for preparing espresso coffee, which is constructed and programmed to have a secondary supply water system which can supply water in conjunction with the machine brewing mechanism to produce an Americano-type coffee beverage. The solution described in WO-A-2014/032110 comprises a first circuit for feeding a first quantity of hot water to a filter holder containing the ground coffee and a second circuit for dispensing a second quantity of hot water, each circuit being provided with respective valves. This solution, while allowing an Americano-type coffee to be prepared automatically, does not provide to dispense only hot water, and it is also complex to build and control since it requires a large number of valves and other components.

Document EP-A-2 353 469 discloses a machine for preparing beverages comprising a first flavouring circuit to supply water through a flavouring substance and a second dilution circuit for mixing the flavoured water with unflavoured water. Only one valve it is provided to close or open the second dilution circuit. The solution described in this document is intended to prepare an Americano type coffee in such a way as to avoid an over-extraction of the flavouring substance, but it does not allow to dispense only hot water, for example for preparing tea, infused beverages or other, since the flavouring circuit remains always open, so that a part of the water could in any case pass through it and therefore be contaminated by residual flavours and/or substances.

Document US-A-2011/0252976 refers to a beverage preparation apparatus comprising a filter holder for the coffee powder and provided with a pipe for the hot water and a pipe for the cold water connected to a common outlet for dispensing water in a beverage container. The solution described in US-A-2011/0252976 allows a user to choose whether to add hot water and/or cold water to a beverage at the end of the preparation of the same, but it does not allow to choose at the beginning a type of beverage having certain characteristics of temperature, quantity and/or intensity.

Document EP-A-2 127 567 refer to a device and a method for producing a frothed beverage such as milk.

The Applicant has thus set himself the purpose of extending the function and functionality of this type of machine, avoiding the disadvantages identified above, and others.

It is a first purpose to dispense different types and/or different quantities of beverage as requested by the user.

Another purpose of the present invention is to provide a machine able to regulate the temperature of the water delivered according to the type of aromatic mixture used and the user's selection.

Another purpose of the present invention is to provide a machine able to dynamically regulate the temperature of the water delivered according to the user's selection.

Another purpose of the present invention is to provide a machine able to regulate the temperature of the water delivered according to the organoleptic characteristics required in the selected beverage.

Another purpose of the present invention is to optimize the efficiency of the water heating.

Another purpose is to dispense the hot water with the precise temperature selected by a user.

Another purpose is to dispense the brewed beverage with the desired degree of intensity and desired concentration of the specific essence.

It is another purpose to facilitate and simplify the use of this machine by the user.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, embodiments described here concern a machine for preparing beverages that allows a user to select the type of beverage to be prepared, for example, a brewed beverage with precise organoleptic characteristics, or only hot water.

According to some embodiments, the machine comprises a selector device, drivable between at least a first position and a second position, to select the type of beverage, that is, an infused beverage or only hot water.

According to some embodiments, the user can also select, by means of suitable commands available on a user interface, the characteristics of the beverage to be dispensed.

According to some embodiments, the user can select the quantity of beverage to be dispensed, choosing the size of the container to be used, for example a jug, cup, mug, glass, or container of different size.

According to some embodiments, the user can select the concentration of the brewed beverage, for example light, normal, or strong.

According to other embodiments, the user can select the dispensing temperature of the beverage selected.

The machine comprises a water tank, of a known type, which can be filled on each occasion, either periodically or continuously, or possibly has access to a continuous source.

Means to indicate the volume of water are possibly present in the water tank, said means possibly being associated with signaling means and/or means to control the water delivery into the tank.

The tank is placed in fluid communication, by at least one circuit, with a filtering container suitable to contain an aromatic mixture to be subjected to infusion, in order to obtain the brewed beverage.

According to some embodiments, the filtering container can be standard, that is, suitable to contain a desired quantity of aromatic mixture on each occasion.

According to some embodiments, the machine comprises a pump suitable to pick up the water from the tank and supply it to the filtering container.

There is also a heating device to heat the water in transit along the water path.

According to some embodiments, the heating device comprises a boiler disposed along the pipe for the fluid through which the water supplied by the pump passes.

According to some embodiments, the machine according to the invention comprises a first outlet for a brewed beverage, cooperating with the filtering container, and a second outlet for the hot water, cooperating with a diversion channel separated from the filtering container.

According to some embodiments, the first and the second outlets are associated with respective selective dispensing means configured to open and/or close one or the other of said outlets.

According to some embodiments, the machine according to the invention comprises a diversion element configured to selectively and alternately divert the flow of water toward the filtering container, or toward the diversion channel.

According to some embodiments, the diversion element is disposed along a segment of circuit which is in common with both the outlets.

According to possible solutions, the diversion element is disposed downstream of the heating device.

According to some solutions, the diversion element can assume at least a first and a second operating state depending on the position of the selector device.

For example, in the first operating state, the diversion element can feed the water to the filtering container, preventing the transit toward the diversion channel, and in the second operational state it can feed the water into the diversion channel, preventing transit towards the filtering container.

According to other embodiments, the selector device can be associated with the selective dispensing means associated with the first and second outlets and directly or indirectly condition the functioning thereof in relation to the opening/closing of the respective outlets.

According to some embodiments, the machine according to the invention comprises a control and command unit configured to regulate the functioning thereof, subjecting one or more parts, depending on the specific selection of the beverage made by the user through the user interface.

According to some embodiments, the control and command unit interacts with the user interface and the selector device to dispense the beverage selected by the user at exit.

According to other embodiments, depending on the position of the selector device, the control and command unit can enable and/or disenable one or more commands of the user interface, possibly for a defined time.

Embodiments described here concern a method of controlling a machine for preparing beverages which provides:
  to receive at inlet a command relating to a type of beverage to be prepared, selected from a brewed beverage or only hot water, by means of a selector element drivable between at least a first and a second position;
  depending on the command received, to position a diversion element disposed along said circuit, in a first or in a second operating state to selectively and alternatively divert a flow of water coming from the tank toward said filtering container cooperating with a first outlet for the brewed beverage, or towards a diversion channel separated from the filtering container and cooperating with a second outlet for the hot water only;
  depending on the position of the selector element related to the type of the beverage selected, to respectively enable and/or disenable specific commands of the user interface to respectively allow or prevent the selection of other characteristics of the beverage to be prepared by the user; and
  based on the command received and the characteristics selected, to regulate the functioning of the pump and the heating device to dispense the selected beverage.

The characteristics of the beverage can comprise, for example, organoleptic characteristics, such as the concentration of dissolved solid substances, temperature, or other.

According to some embodiments, receiving the command relating to the type of beverage to be prepared comprises the detection of the position of the selector element by means of position sensors.

According to other embodiments, if the type of beverage to be prepared is a brewed beverage, the method according to the invention provides to enable selection commands suitable at least to select the concentration of the beverage to be prepared.

According to possible variants, if the type of beverage to be prepared is hot water, the method according to the invention provides to enable selection commands suitable at least to select the temperature to which to heat the water.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
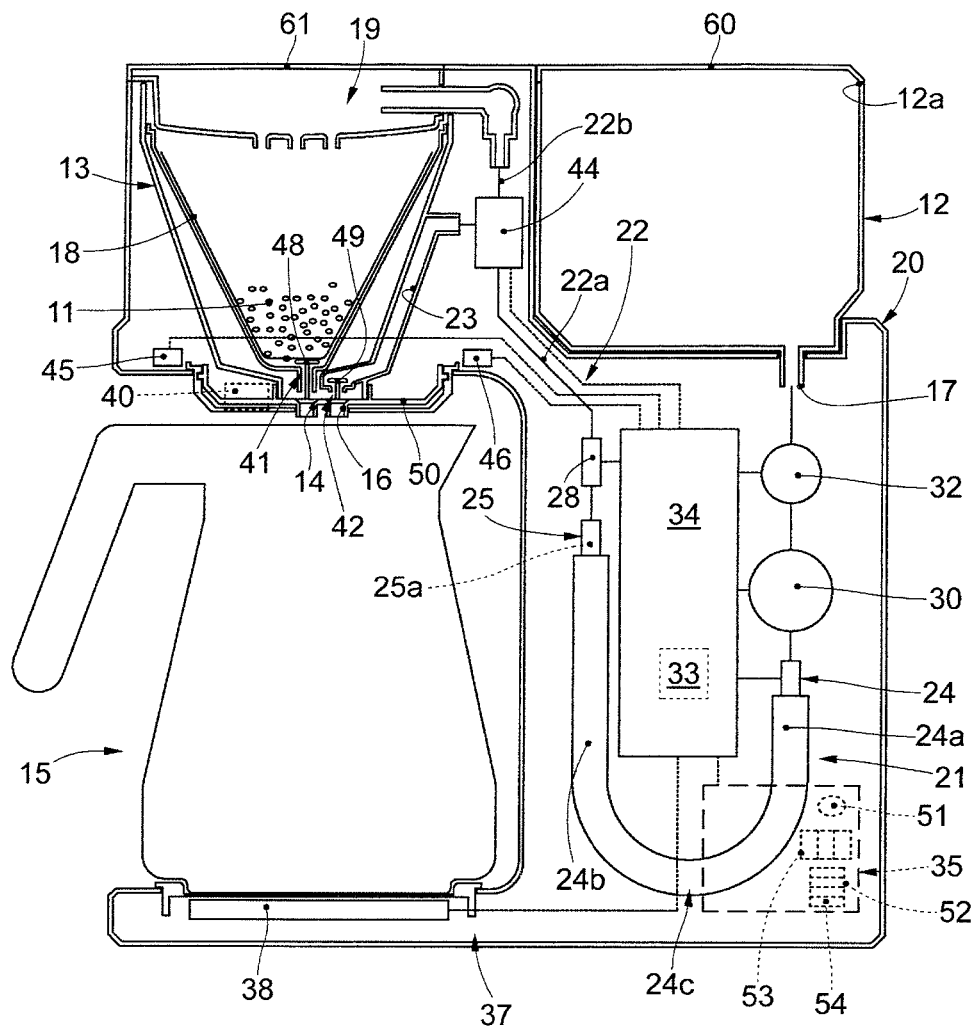
FIG. 1 is a schematic view of a machine for preparing beverages, according to embodiments described here.
Figure 2:
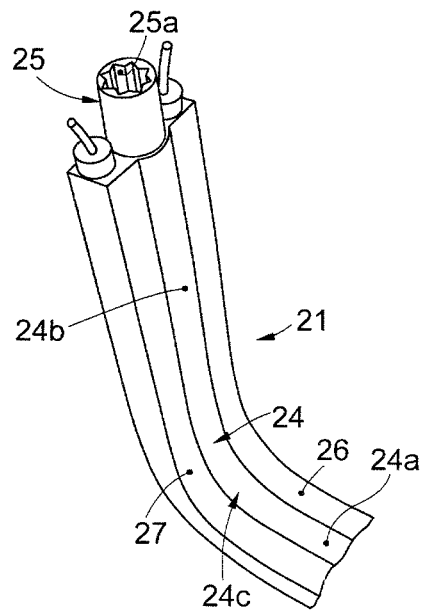
FIG. 2 is a detailed schematic view of a component of the beverage preparation machine in FIG. 1.
Figure 3:
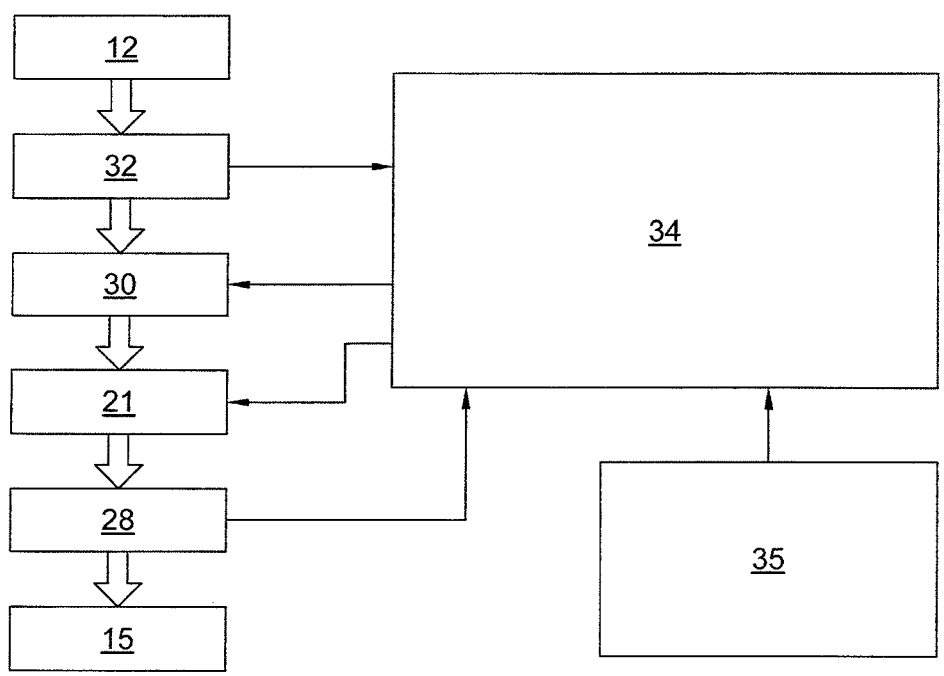
FIG. 3 is a schematic view of the control system of the beverage preparation machine according to embodiments described here.

Embodiments described here with reference to FIG. 1 concern a machine 10 for preparing a hot or cold beverage according to a selection made by a user.

According to some embodiments, the machine 10 according to the invention allows a user to select a type of beverage to be prepared and the respective organoleptic and quantity characteristics of the beverage.

According to some embodiments, the machine 10 comprises a selector device 40 drivable by a user to select a type of beverage selected between a brewed beverage or hot water.

According to some embodiments, the machine 10 also comprises a user interface 35 provided with suitable commands 51, 52, 53, for example, push buttons, selection knobs, and/or a touch screen, by which the user can select the characteristics of the beverage to be prepared.

According to a variant, the selector device 40 is integrated in the user interface 35.

According to some embodiments, the selection of a beverage comprises the selection of the type of beverage and one or more characteristics including quantity, concentration, temperature.

According to some embodiments, the user interface 35 can comprise commands to select the quantity of beverage to be dispensed 51, that is, the size of a receptacle 15 to be used, for example a jug, a half jug, a cup, a mug, a glass, or suchlike.

Furthermore, the user interface 35 can comprise commands to select the concentration 53 of the brewed beverage, for example light, normal, or strong, or other values.

According to a variant, the user interface 35 also comprises commands to select the temperature 52, said commands, according to another variant, can also affect the delivery of the water itself.

The machine 10 comprises a tank 12 for the water, fluidly connected to a filtering container 13 suitable to contain an aromatic mixture 11 to be infused to obtain the brewed beverage.

For example, the aromatic mixture 11 can be a powdered mixture and/or with a desired grain size, in leaves, or portions thereof, of coffee, tea, or other vegetable substance, or other.

According to some embodiments, the machine 10 comprises a first outlet 14 cooperating with the filtering container 13 through which the brewed beverage can be delivered into the receptacle 15.

According to some embodiments, the machine 10 comprises a second outlet 16 for hot water, through which hot water only can be dispensed into the receptacle 15 without passing through the filtering container 13.

According to possible solutions, the first outlet 14 and the second outlet 16 are advantageously disposed adjacent to each other, so as to allow to dispense the brewed beverage or hot water in the same zone, facilitating positioning of the receptacle 15 by the user. For example, the first 14 and the second outlet 16 can be made in a flange 50 that closes the housing 20, located below the filtering container 13.

According to some embodiments, the first outlet 14 and the second outlet 16 are associated with respective selective dispensing means 41, 42, configured to open and/or close the outlets 14, 16 or possibly also to regulate the flow through them.

According to some embodiments, the selective dispensing means 41, 42 can comprise one or more valves 48, 49.

According to a variant, both the first outlet 14 and the second outlet 16 are fluidly connected to the tank 12 by at least one circuit 22, 23.

According to some embodiments, the first outlet 14 and the second outlet 16 partly share at least one segment of the same circuit 22.

According to other embodiments, the second outlet 16 is put in fluid communication with the circuit 22 by means of a diversion channel 23, separated from the filtering container 13.

According to some embodiments, the diversion channel 23 is connected to a first portion 22a of the circuit 22 along the path of the water. In other words, the first portion 22a defines a segment of common path for the water between the tank 12 and, respectively the first outlet 14 or the second outlet 16.

According to some embodiments, the diversion channel 23 can be made in a peripheral portion of the filtering container 13, separated from the compartment where the aromatic mixture 11 is positioned.

According to other embodiments, the diversion channel 23 can be an independent channel.

The tank 12 can generally be a container configured to contain a certain quantity of water to prepare a beverage. For example, the volume of the tank 12 can be equal to at least the volume of water needed to fill a jug.

The tank 12 can be provided with an introduction aperture 12a, associated with a lid 60, through which water can be introduced into it, and an outlet aperture 17 from which the desired quantity of water can be taken on each occasion to prepare the selected beverage.

According to some embodiments, the tank 12 can be positioned inside a housing 20 of the machine 10, or attached thereto, possibly removably, to be subjected to cleaning and/or for filling.

According to some embodiments, the filtering container 13 for the mixture can have a funnel shape, and a filtering element 18 can be inserted therein, suitable to retain the solids of the aromatic mixture 11, preventing them from being dispensed together with the brewed beverage.

According to some embodiments, access means 61 and/or movement means can be provided, configured to allow access to the filtering container 13 in order to introduce on each occasion a desired quantity of aromatic mixture 11 and/or remove it together with the possible filtering element 18 at the end of dispensing of the beverage prepared.

According to some embodiments, the machine 10 comprises a diffusion head 19, disposed above the filtering container 13 and configured to dispense the water arriving from the tank 12 above the aromatic mixture 11 so as to distribute the water on the aromatic mixture 11.

According to some embodiments, the diffusion head 19 can be configured to dispense the water in a shower, jets, mist, or also possibly in a continuous flow.

The machine 10 also comprises a heating device 21, disposed between the tank 12 and the filtering container 13, and configured to heat the water in transit to the desired temperature.

According to some embodiments, the heating device 21 is disposed along the hydraulic circuit 22 that connects the tank 12 to the diffusion head 19. The heating device 21, in particular, can be disposed in the shared first portion 22a of the circuit 22.

According to some embodiments, the heating device 21 comprises a boiler 24 having at least a conduit 25 defining a transit channel 25a for the water to be heated, and at least one heating element 26 associated with the boiler 24 and configured to heat the water inside it.

According to some embodiments, the boiler 24 with its transit channel 25a defines a segment of the circuit 22.

According to other embodiments, the boiler 24 comprises at least one first smaller branch 24a and a second larger branch 24b.

The second larger branch 24b is disposed in a vertical direction, so as to reduce thermal losses to a minimum.

According to some embodiments, the boiler 24 can be L-shaped, with the smaller branch 24a disposed at least partly horizontally.

According to possible embodiments, the boiler 24 comprises an accumulation zone 24c, in which possible water residues present in the boiler 24 can be collected at the end of the water supply.

The accumulation zone 24c is preferably disposed upstream of the larger vertical branch 24b along the path of the water.

According to possible variant embodiments, the boiler 24 can be U-shaped or J-shaped.

When the water flows in a vertical segment, in fact, it is in direct contact with all the internal walls of the transit channel 25a, so that the heat exchange surface is maximized.

In the horizontal segments, on the contrary, if the pressure and/or the flow of the fed water is not high enough, the quantity of water fed could be insufficient to fill the section of the transit channel 25a, thus reducing the usable heat exchange surface.

According to some embodiments, the heating device 21 comprises two or more heating elements 26, 27.

According to other embodiments, the heating elements 26, 27 can be electrical resistances disposed along the longitudinal development of the boiler 24, in a linear manner or in a spiral.

According to some embodiments, the heating elements 26, 27 are autonomous and independent of one another. In particular, the heating elements 26, 27 can be selectively fed according to the temperature to which the water in transit is to be heated and/or depending on the state of progress of the beverage preparation operation.

According to some embodiments, the heating elements 26, 27 have the same power, that is, each one corresponds to 50% of the overall power of the heating device 21.

According to possible variants, the heating elements 26, 27 have different powers from each other, thus allowing a further modulation of the heating temperature.

For example, according to possible implementations, the heating elements 26, 27 can have proportional powers, for example 60%-40%, 70%-30%, 75%-25%, 80%-20%, or intermediate values.

According to some embodiments, the machine 10 also comprises temperature sensor means 28 disposed along the circuit 22 and configured to detect the temperature of the water in transit.

According to some embodiments, the temperature sensor means 28 are disposed downstream of the boiler 24 so as to detect the temperature of the water in transit near the area in which it comes into contact with the aromatic mixture 11.

According to possible variants, the temperature sensor means 28 can be positioned inside the boiler 24, possibly in correspondence with the exit end of the transit channel 25a.

According to other variants, temperature sensor means 28 can be provided both integrated in the boiler 24 or in the heating device 21, and also disposed downstream thereof and possibly upstream as well, so as to be able to regulate the supply of the one or more heating elements 26, 27 also depending on the difference in water temperature detected upstream and downstream of the heating device 21.

According to possible solutions, the temperature sensor means 28 can comprise a Negative Temperature Coefficient (NTC) resistance, located inside a pipe defining a segment of the circuit 22.

According to some embodiments, the machine 10 comprises a pump 30 disposed along the circuit 22 and configured to draw the water from the tank 12 and feed it through the boiler 24 toward the filtering container 13.

According to some embodiments, the pump 30 can be selectively activated to draw on each occasion the quantity of water suitable for preparing the quantity of beverage selected by the user.

According to some embodiments, the pump 30 is of the adjustable flow type, so that it is possible to regulate the speed of the water that passes through the boiler 24 and through the aromatic mixture 11.

According to some embodiments, the machine 10 comprises a flowmeter 32 or other flow detection means disposed in the tank 12 and/or along the circuit 22 to measure the quantity of water in transit through it.

According to some embodiments, the flowmeter 32 is located upstream of the pump 30, allowing a faster and more efficient detection of the flow rate and therefore a dynamic and real-time regulation of the pump 30.

According to some embodiments, the machine 10 comprises a diversion element 44 disposed along the circuit 22 and configured to selectively divert the flow of water to the filtering container 13 or to the diversion channel 23.

The diversion element 44 in particular separates the circuit 22 into two portions 22a, 22b, of which the first portion 22a is disposed upstream of the diversion element 44 and defines the shared segment of the circuit 22, and the second portion 22b is disposed downstream thereof and extends as far as the diffusion head 19.

According to variant embodiments, the diversion element 44 is disposed downstream of the heating device 21 and the temperature sensor means 28.

In this way, if the user selects the preparation of a brewed beverage, the water is made to pass in the filtering container 13 through the aromatic mixture 11, while if the user selects the preparation of hot water only, the heated water is diverted in such a way that it does not pass through the filtering container 13, preventing the risk of possible contamination.

According to other embodiments, the diversion element 44 can assume at least a first state in which it closes the diversion channel 23 and allows the water to transit toward the filtering container 13, and a second state in which it closes the circuit 22 toward the filtering container 13 and allows the water to transit through the diversion channel 23.

According to possible solutions, the diversion element 44 can comprise a three-way valve, of which two paths are associated with the circuit 22 respectively as inlet and as first outlet, and one path is associated path as second outlet to the diversion channel 23.

According to other embodiments, the diversion element 44 assumes the first or second operating state, depending on the position of the selector device 40.

For example, it can be provided that the first position of the selector device 40 corresponds to the selection of a brewed beverage and determines the first state of the diversion element 44, while the second position corresponds to the selection of hot water only and determines the second state of the diversion element 44.

According to other embodiments, the selector device 40 can be connected to the selective dispensing means 41, 42 associated with the first 14 and the second outlet 16 and can directly or indirectly condition the functioning thereof, in relation to the opening or closing of the first and second outlets 14, 16.

According to some embodiments, it can be provided that, depending on the position of the selector device 40, one of the selective dispensing means 41, 42 closes/opens its outlet 14, 16, while the other of the selective dispensing means 41, 40 opens/closes its outlet 16, 14.

For example, when the selector device 40 is in the first position, the selective dispensing means 41, 42 can be disposed so as to open the first outlet 14 and close the second outlet 16; when the selector device 40 is in the second position, on the contrary, they can close the first outlet 14 and open the second outlet 16.

According to possible variants, the selector device 40 can assume three different positions, with a third position in which the selective dispensing means 40, 41 close both outlets 14, 16 with the respective valves 48, 49.

Closing the valves 48, 49 allows, in particular, to remove the receptacle 15 during the dispensing of the beverage without risk of drips. This is particularly useful when dispensing a brewed beverage. In fact, when dispensing water only, switching off the pump 30 implies stopping the dispensing, while when dispensing a brewed beverage, the dispensing continues for a certain period of time after the pump 30 has been switched off, because of the delay due to the transit of the water through the aromatic mixture 11.

According to possible solutions, the machine 10 can be provided with presence detection means, not shown, configured to detect the presence of a receptacle 15 in correspondence with one or the other outlet 14, 16. The presence detection means can be connected to the selective dispensing means 41, 42, so as to regulate their functioning.

According to some embodiments, the selector device 40 can be a mechanical device, such as a lever, a sliding bar, or similar element, which can be manually moved by the user.

According to these embodiments, the selector device 40 can directly drive the selective dispensing means 41, 42.

According to variant embodiments, the selector device 40 can be an electrical or electronic command, which can be activated by the user or according to a functioning program. In this case, the selector device 40 can indirectly drive the selective dispensing means 41, 42.

According to other embodiments, position sensor means 45, 46 can be provided, configured to detect the position of the selector device 40.

According to some embodiments, the position sensor means 45, 46 can comprise one or more of either optical sensors, proximity sensors, or other similar or comparable elements, possibly cooperating with mating elements associated with the selector device 40.

According to some embodiments, the machine 10 comprises a control and command unit 34, configured to regulate the operation of the machine 10 according to the user's selection, to prepare on each occasion the selected beverage.

According to some embodiments, the control and command unit 34 can comprise, or be connected to, a memory unit 33, in which information can be memorized relating to the operating parameters for the preparation of each selectable beverage.

According to variant embodiments, the information can comprise the optimum values of water temperature and/or speed for each beverage selectable by the user, that is, for each combination defined by type of beverage, quantity, concentration, temperature, etc.

The regulation of the temperature makes it possible to prepare, in addition to coffee, beverages based on tea or other vegetable substances, which generally require lower infusion temperatures than those required for coffee.

By way of example, while for a coffee beverage a water temperature preferably comprised between about 92° C. and about 96° C. is required, to prepare tea a water temperature comprised between about 70° C. and about 90° C. is preferable, depending on the quality of the tea used.

According to some embodiments, the control and command unit 34 can be connected to the position sensors 45, 46 to receive an indication of the position of the selector device 40.

According to some embodiments, the control and command unit 34 is connected to the diversion element 44 and is configured to modify the state of the latter according to the indication received from the position sensors 45, 46.

According to possible variant embodiments, it can be provided that the control and command unit 34 can modify the state of the diversion element 44 even during the preparation of the beverage, so as to dilute the infused beverage and, for example, prepare an "ultra-light" beverage. In this case, during the infusion of the dispensed beverage, the control and command unit 34 can keep both outlets 14, 16 open, acting on the respective selective dispensing means 41, 42, and alternately modify the status of the diversion element 44 so as to dispense a portion of the water directly into the receptacle 15 without making it transit through the aromatic mixture 11, possibly exploiting the time needed for the water in the filter container 13 to pass through the aromatic mixture 11.

According to other embodiments, the control and command unit 34 can act on the selective dispensing means 41, 42 to close and open the respective outlets 14, 16.

According to some embodiments, the selector device 40 is subjected to a functioning program executed by the control and command unit 34. According to such embodiments the control and command unit 34 can act on the selector device 40 to command the functioning of the selective dispensing means 41, 42.

Providing an automated activation/deactivation of the selective dispensing means 41, 42 also allows to fill the filtering container 13 with the desired quantity of water and to keep the first outlet 14 closed for a certain time before dispensing the beverage into the receptacle 15 This allows to prepare a beverage with the desired degree of infusion, for example, to be able to prepare a cold brewed beverage, commonly referred to as cold-brew, which requires high infusion times of the cold aromatic mixture 11, even hours, or to prepare a tea, or a herbal tea, by hot infusion of the aromatic mixture 11.

According to a variant, means are provided which determine, depending on the organoleptic characteristics required for the type of beverage, the closing time of the valve 48 associated with the infusion.

According to other embodiments, depending on the position of the selector device 40, the control and command unit 34 can also enable and/or disenable one or more commands of the user interface 35.

In this way, depending on the selection of brewed beverage or hot water, the user can select additional characteristics of the beverage to be prepared.

According to some embodiments, if the brewed beverage is selected, the control and command unit 34 can enable commands of the user interface 35 suitable to select quantity 51, concentration 52, and/or temperature 53.

According to some embodiments, if the brewed beverage is elected, the control and command unit 34 can also enable a command for the function of dispensing the infused beverage on ice 54.

According to possible variants, if hot water is selected, the control and command unit 34 can enable commands of the user interface 35 to select quantity 51 and/or temperature 53, and disenable those for the selection of the concentration 52.

According to other variations, it can be provided that the commands to select quantity 51 are active for each type of beverage.

According to some embodiments, the control and command unit 34 is also connected to the temperature sensor means 28 and to the flowmeter 32 to receive the data detected by them.

The control and command unit 34 is also configured to compare the data received with the values memorized in the memory unit 33.

Depending on the selection made by the user on the type of beverage to be prepared and/or characteristics selected, and on the basis of the data received from the temperature sensor means 28 and the flowmeter 32, the control and command unit 34 can regulate the flow rate of the pump 30 and/or the switching on/off of the heating device 21 to obtain the beverage selected.

According to some embodiments, the control and command unit 34 receives in real time the data relating to the flow rate and temperature of the water and dynamically regulates, with a feedback control, the pump 30 and the heating device 21.

According to a variant, the control and command unit 34 can regulate the flow rate of the pump 30 and activate the heating device 21 by means of a PID type regulation system, or by other suitable means.

According to these embodiments, for example, the PID regulation system can receive as inputs the flow rate of the water detected by the flowmeter 32 and the temperature of the water detected by the temperature sensor means 38 and supply as outputs the flow rate of the pump 30 and the power supply of the heating element 26, 27 of the heating device 21.

In particular, given the same temperature of the heated water, the control and command unit 34 can decrease or increase the flow rate of the pump 30, and hence the water speed, respectively, to extract more or fewer substances from the aromatic mixture 11, and thus regulate the intensity of the beverage.

For example, it can be provided that the control and command unit 34, to modify the flow rate, acts on the feed power of the pump 30, in such a way as to increase or decrease the number of revs of the motor of the pump.

According to other embodiments, the pump 30 can be selectively activated/deactivated to deliver the water in pulses, so as to perform a "pour-over" infusion, that is, to obtain a particularly slow extraction of the substances from the aromatic mixture 11.

According to other embodiments, the control and command unit 34 can selectively switch on and off the at least one heating element 26, 27 according to a certain duty-cycle, so as to keep it at the suitable temperature.

According to other embodiments, the control and command unit 34 autonomously and independently switches on and off each heating element 26, 27, so as to suitably modulate the temperature of the heating device 21 according to the operations to be performed.

For example, the temperature of the heating device 21 can be modulated on the basis of slow preheating operations, temperature maintenance, high temperature delivery, or other.

The possibility of dynamically modifying both the flow rate of the pump 30 and also the temperature of the heating device 21, and hence of the water, allows to optimize the extraction of the substances of the aromatic mixture 11 to obtain the desired intensity of the beverage as selected by the user, without needing a pre-infusion step, thus meeting the requirements for high quality.

According to possible variants, however, it can be provided to perform a pre-infusion step of the aromatic mixture 11 before dispensing the brewed beverage.

According to other embodiments, the housing 20 is provided with a support base 37 for the receptacle 15.

According to possible variants, the support base 37 can be provided with additional heating means 38 selectively activated by the control and command unit 34 to keep the beverage dispensed in the receptacle 15 warm.

For example, the additional heating means 38 can comprise a Positive Coefficient Temperature (PCT) resistance.

According to possible embodiments, not shown, other support bases can be provided, possibly folding or mobile, configured to bring the receptacle 15 closer to the outlet of the beverage 14 so as to prevent any splashes of the beverage, if the receptacle 15 used is either a cup, or a glass.

Embodiments described here also concern a method for controlling a machine 10 which provides:

to receive at inlet in the control and command unit 34 a command to select a type of beverage to be prepared, respectively selected between an infused beverage or hot water, by means of a selector device 40 drivable by a user between at least a first position and a second position;

depending on the command received, to determine the state of a diversion element 44 disposed along the water supply path to selectively and fluidly connect the tank 12 to the first outlet 14 for the brewed beverage, cooperating with the filtering container 13, or to the second outlet 16 for the hot water, cooperating with the diversion channel 23;

on the basis of the command received, to respectively enable and/or disenable specific commands 51, 52, 53, 54 of the user interface 35 to respectively allow or prevent the user from selecting other characteristics of the beverage to be prepared;

on the basis of the command received and of the characteristics selected, to regulate the functioning of the pump 30 and the heating device 21 to dispense the selected beverage.

In particular, if a brewed beverage is selected, the method provides to make the water transit in the filtering container 13 through the aromatic mixture 11, while if hot water is selected, the water is diverted so that it does not transit through the filtering container 13 and is directly dispensed into the receptacle 15.

According to some embodiments, receiving the command relating to the type of beverage to be prepared comprises detecting the position of the selector element 40 by means of the position sensors 45, 46.

According to other embodiments, if a brewed beverage is selected, the method provides to enable at least the commands to select the concentration 52 of infused beverage.

According to other embodiments, if a brewed beverage is selected, the method also provides to enable commands for the function of dispensing the brewed beverage on ice 54.

According to possible variants, if hot water is selected, the method according to the invention provides to enable at least the commands to select the temperature 53.

According to other embodiments, the method according to the invention provides to enable the commands to select the temperature 53 for each type of beverage selected.

According to other embodiments, it can be provided that the user can enter the desired temperature value independently, or can choose from a plurality of pre-set values.

It is clear that modifications and/or additions of parts can be made to the machine 10 and the method for preparing a beverage as described heretofore, without departing from the field and scope of the present invention.

It is also clear that, although the present invention has been described with reference to some specific examples, a person of skill in the art shall certainly be able to achieve many other equivalent forms of machine 10 and method for preparing a beverage, having the characteristics as set forth in the claims and hence all coming within the field of protection defined thereby.

The invention claimed is:

1. A machine for preparing beverages comprising: at least one tank for water, fluidly connected, by means of a circuit, to a filtering container suitable to contain an aromatic mixture to be brewed, a pump to feed the water from said tank to said circuit, a heating device to heat the water in transit, and a control and command unit functionally connected to a user interface comprising commands suitable to select characteristics of said beverage to be prepared, wherein said machine comprises a selector device drivable by a user between at least a first position and a second position in relation to the selection of a type of beverage, either a brewed beverage or hot water, a first outlet for the brewed beverage, disposed downstream of said filtering container along the path of the water, a second outlet for dispensing exclusively the hot water, the first and second outlets disposed below the filtering container, the second outlet disposed adjacent to said first outlet and cooperating with a diversion channel separated from said filtering container and connected to said tank by said circuit, and a diversion element disposed along said circuit and configured to assume a first or a second operating state as a function of the position of said selector device to selectively and alternatively divert a flow of water coming from said tank towards said filtering container or towards said diversion channel, wherein said diversion element comprises a three-way valve, of which two paths are associated with the circuit respectively as inlet and as first outlet, and one path is an associated path as second outlet to the diversion channel, and wherein said first outlet and said second outlet are associated with respective selective dispensing means configured to open, close, and/or regulate flow through said outlets, wherein said selector device is operatively connected to said selective dispensing means and controls the functioning thereof; and wherein said selector device is also drivable by the user to a third position, wherein when the selector device is in the first position and in the second position the selective dispensing means respectively open the first outlet and close the second outlet and vice versa, and when the selector device is in the third position said selective dispensing means close both the first outlet and the second outlet.

2. The machine as in claim 1, wherein said diversion channel is disposed adjacent to said filtering container, and wherein the selective dispensing means comprises a first selective dispensing means associated with the first outlet and having a first valve disposed below the filter container and a second selective dispensing means associated with the second outlet and having a second valve disposed adjacent the first valve, and wherein the selector device is a lever, a sliding bar, or other shiftable mechanical component and is manually shiftable by the user.

3. The machine as in claim 1, wherein said diversion channel is made in a peripheral portion of the filtering container.

4. The machine as in claim 1, comprising position sensor means connected to said control and command unit and configured to detect the position of said selector device.

5. The machine as in claim 1, wherein said user interface comprises commands arranged to select the characteristics of the beverage to be prepared, the characteristics including quantity, concentration, and/or temperature of the beverage to be prepared, and/or comprises commands to dispense the beverage on ice, said commands being selectively enabled/disabled by a user interface operatively coupled to said control and command unit depending on the position of said selector device.

6. The machine as in claim 1, comprising presence detection means configured to detect the presence of a receptacle in correspondence with one or the other outlet, said presence detection means being connected to the selective dispensing means so as to regulate their functioning.

7. The machine as in claim 1, wherein said selector device is drivable by the user or according to a functioning program executed by said control and command unit.

8. A method for preparing a beverage in a machine for preparing beverages, comprising a tank for the water, fluidly connected, by means of a circuit, to a filtering container suitable to contain an aromatic mixture to be brewed, wherein said method comprises:

receiving at inlet in a control and command unit a command, the command arranged to select a type of beverage to be prepared, the type of beverage being respectively selected from a brewed beverage or only hot water, by means of a selector device drivable between at least a first position and a second position;

depending on the command received in relation to the type of beverage, to position a diversion element being a three-way valve disposed along said circuit in a first or a second operating state to selectively and alternatively divert a flow of water coming from the tank towards said filtering container cooperating with a first outlet for the brewed beverage, or towards a diversion channel separated from said filtering container and cooperating with a second outlet for the hot water only;

depending on the position of said selector device related to the type of beverage selected, respectively to enable and/or disable commands of a user interface respectively to allow, or prevent, selection of characteristics of the beverage to be prepared by the user; and regulating, based on the type and characteristics of the selected beverage, the functioning of said pump and of said heating device to dispense said selected beverage; and further wherein associating said first outlet and said second outlet with respective selective dispensing means configured to open, close, and/or regulate flow through said outlets, and operatively connecting said selector means to said selective dispensing means to control the functioning thereof; and further arranging the selector device to be movable by a user to three different positions, wherein in said first position and in said second position said selective dispensing means respectively open said first outlet and close said second outlet and vice versa, and in said third position said selective dispensing means close both the first outlet and the second outlet.

9. The method as in claim 8, wherein receiving said command relating to the type of beverage to be prepared comprises detecting the position of said selector element by means of position sensors connected to said control and command unit.

10. The method as in claim 8, wherein if the selected beverage is the brewed beverage, enabling a command suitable to select a characteristic of the beverage comprising concentration.

11. The method as in claim 8, wherein, if the selected beverage is the brewed beverage, enabling a command suitable to select a dispensing function of said brewed beverage on ice.

12. The method as in claim 8, wherein, if the type of beverage to be prepared is hot water, enabling one or more commands arranged to select a temperature to which the water is to be heated.

13. The method as in claim 8, wherein, if the type of beverage to be prepared is an "ultra-light" brewed beverage, keeping both outlets open acting on the respective selective dispensing means, and alternately modifying the status of the diversion element during the preparation and delivery of the brewed beverage, so as to dilute the brewed beverage, dispensing alternatively a portion of the water directly into a receptacle without making it transit through the aromatic mixture, exploiting the time needed for the water delivered in the filter container to pass through the aromatic mixture.

14. The machine as in claim 2, wherein the first and second outlets are carried by a common flange disposed beneath the filtering container, and wherein the selector device is disposed adjacent to and mechanically coupled to the first and second outlets.

* * * * *